United States Patent [19]

Rey et al.

[11] Patent Number: 4,859,005

[45] Date of Patent: Aug. 22, 1989

[54] THREE-PORT FLUID VALVE

[75] Inventors: Pierre J. Rey, Saint Laurent du Var; Maurice DeRaco, Grasse, both of France

[73] Assignee: Eaton Corporation, Cleveland, Ohio

[21] Appl. No.: 219,945

[22] Filed: Jul. 15, 1988

Related U.S. Application Data

[63] Continuation of Ser. No. 72,321, Jul. 13, 1987, abandoned.

[30] Foreign Application Priority Data

Jul. 26, 1986 [GB] United Kingdom ................. 8618301

[51] Int. Cl.⁴ ......................... B60T 8/36; B60T 13/68; B60T 15/02
[52] U.S. Cl. ............................... 303/119; 137/596.17; 251/129.21; 303/69
[58] Field of Search ......... 251/129.21, 129.01–129.22, 251/30.01–30.05, 117; 137/596.17, 596.12, 627.5; 303/119, 15, 61–63, 68–69, 113, 118, 117, 115, 116, 89; 188/353

[56] References Cited

U.S. PATENT DOCUMENTS

| | | | |
|---|---|---|---|
| 3,550,966 | 12/1970 | Leiber | 303/119 |
| 3,617,098 | 11/1971 | Leiber | 303/119 |
| 3,847,449 | 11/1974 | Adahan | 303/61 X |
| 3,970,111 | 7/1976 | Brüne et al. | 303/119 X |
| 3,989,063 | 11/1976 | Brouwers et al. | 303/119 X |
| 4,129,341 | 12/1978 | Pauwels | 303/119 |
| 4,206,950 | 6/1980 | Elliott | 303/119 X |
| 4,395,072 | 7/1983 | Belart | 303/119 X |
| 4,453,782 | 6/1984 | Arikawa et al. | 303/119 X |
| 4,477,125 | 10/1984 | Belart et al. | 303/119 X |
| 4,546,955 | 10/1985 | Beyer et al. | 251/129.1 X |
| 4,561,701 | 12/1985 | Fujii et al. | 303/119 |
| 4,579,146 | 4/1986 | Tsuru et al. | 137/596.17 X |
| 4,620,565 | 11/1986 | Brown | 303/119 X |
| 4,640,558 | 2/1987 | Nomura et al. | 137/596.17 X |
| 4,655,255 | 4/1987 | Rode | 137/596.17 X |
| 4,668,024 | 5/1987 | Nakanishi et al. | 303/69 X |
| 4,679,589 | 7/1987 | Inden et al. | 303/119 X |
| 4,681,143 | 7/1987 | Sato et al. | 251/129.1 X |
| 4,690,371 | 9/1987 | Bosley et al. | 251/129.1 X |
| 4,705,324 | 11/1987 | Kervagoret | 303/119 |
| 4,765,693 | 8/1988 | Stegmaier | 303/119 |
| 4,772,075 | 9/1988 | Wupper et al. | 137/596.17 X |
| 4,790,351 | 12/1988 | Kervagoret | 303/119 X |

FOREIGN PATENT DOCUMENTS

| | | | |
|---|---|---|---|
| 0256272 | 2/1988 | European Pat. Off. | 303/119 |
| 3543882 | 6/1987 | Fed. Rep. of Germany | 303/119 |
| 2559726 | 8/1985 | France . | |
| 0033159 | 2/1985 | Japan | 303/119 |
| 2131521 | 6/1984 | United Kingdom | 137/596.17 |

Primary Examiner—Douglas C. Butler
Attorney, Agent, or Firm—R. A. Johnston

[57] ABSTRACT

A double solenoid valve especially for anti-lock braking (ABS) applications has a normally open conduit for connection to a first port fluidically in series with a normally closed conduit between second and third ports. A slow two-way path continuously connects the second port. The double valve when used in ABS can handle incipient locking, actual locking, quick releasing to normal after emergency anti-lock action, and purge modes.

17 Claims, 2 Drawing Sheets

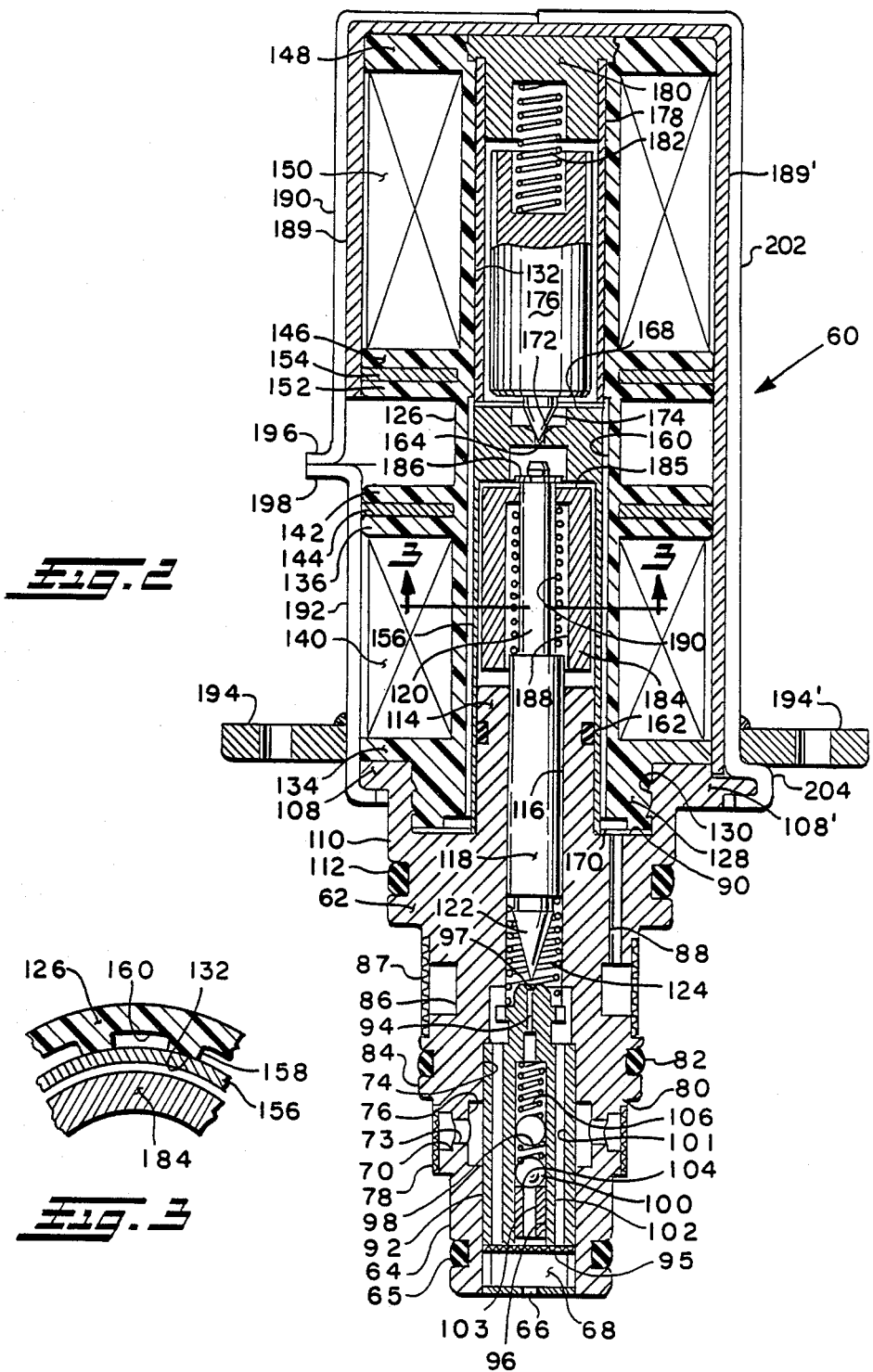

THREE-PORT FLUID VALVE

CROSS REFERENCE TO RELATED APPLICATIONS

This application is a continuation-in-part of Ser. No. 072,321 filed July 13, 1987, now abandoned.

The present invention relates to a fluid valve having three external ports and providing selective control of the internal fluid paths between the ports. It is well known to control flow between two of the ports, or to divert flow, in response to command signals (which usually energize solenoids producing movements in armatures fixed to closure members e.g. diaphragms).

It is often desired so to control the hydraulic oil flow in an anti-lock braking system (ABS) that normal braking can be resumed rapidly and in controlled fashion once the surface condition producing the locking of the wheel of a vehicle has been passed by; conversely the anti-lock condition should be sensed and maintained while a real skidding condition is still being traversed. This may require very rapid cycling between anti-lock and normal braking conditions, sometimes called "modulation" of the brake actuation. The invention is especially useful for a hydraulic or other fluid-operated ABS and, in such a system, is based upon system identification of (1) an incipient locking condition ("early warning"), or (2) actual locking, moderate or severe. Such identification can be derived from a sensing of rapidly decreasing or zeroing wheel or axle velocities, e.g. for example relative motions between the braking friction members or shoes, and the wheel discs or hub linings. Relative movement sensings form no part of this invention, and will not be further discussed herein. Suffice it to state that, for the ABS application of the invention, means are provided to sense incipient and actual locking of one wheel at least, and to issue appropriate respective first and second command signals.

Other requirements for two different fluidic flow conditions between three ports of a valve will occur to the person of ordinary skill as benefiting from this invention.

BRIEF DESCRIPTION OF THE DRAWINGS

FIG. 2 is a view similar to FIG. 1 of an alternate embodiment of the invention adapted for connection to a connector block having supply, brake actuator and reservoir return ports provided therein; and, FIG. 3 is an enlarged portion of a sectional view taken along section-indicating lines 3—3 of FIG. 2.

DETAILED DESCRIPTION

Figure 1:
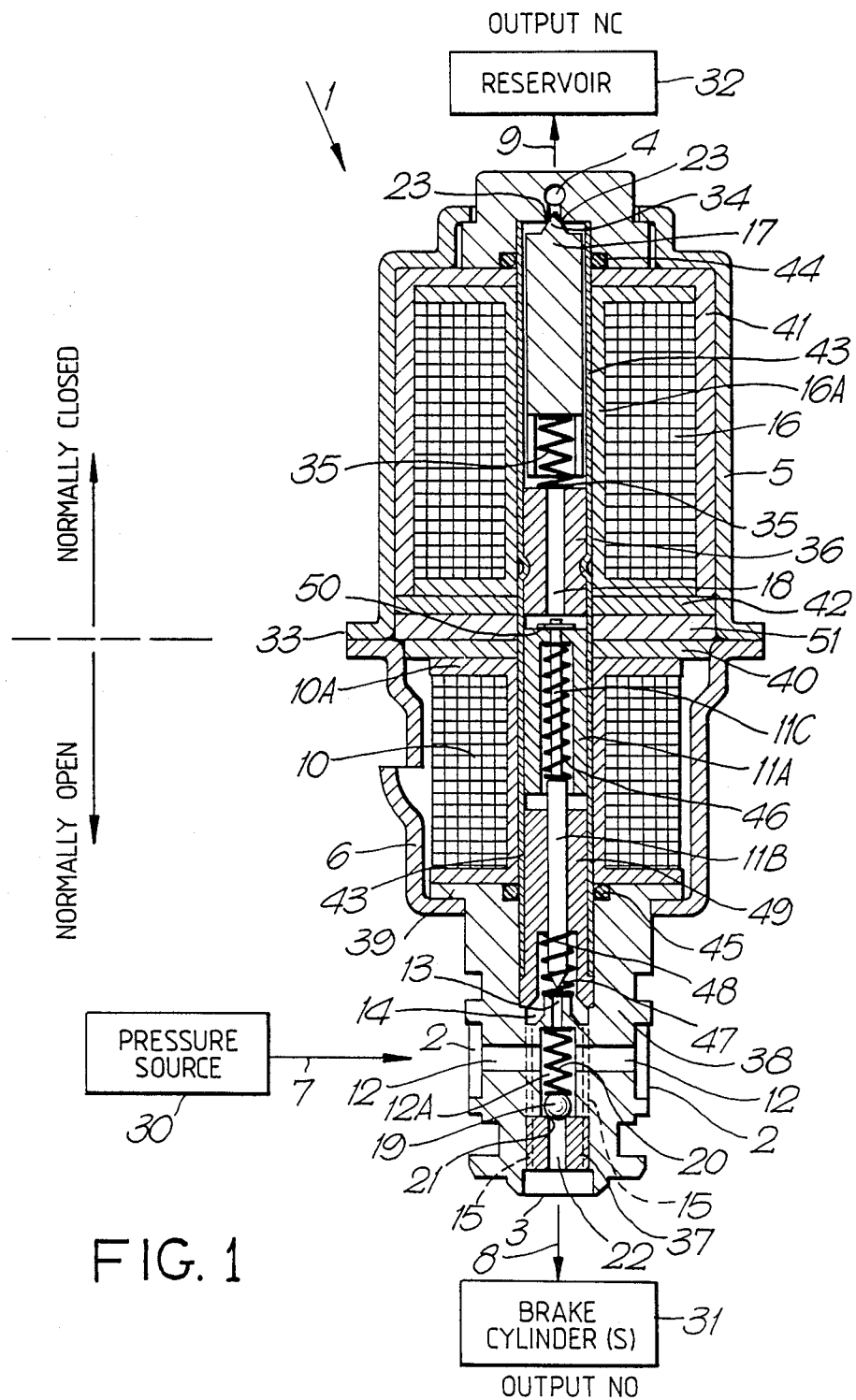
FIG. 1 is a cross-section of an embodiment of the invention and adapted for in-line connection between a brake actuator and a return reservoir.

An embodiment will not be described in conjunction with the drawing, the sole Figure of which shows in sectional elevation a hydraulic oil valve having two separately commanded and effective controllers.

Specifically, the valve 1 has a first port 2 connected to an external fluid path 7 e.g. for inputting to a fluid pressure source 30 such as a brake master or slave cylinder, a second port 3 connected to an external fluid path 8 e.g. for connection to a brake cylinder 31 of a road wheel, and a third port 4 connected to an external fluid path 9 e.g. for outputting to a fluid reservoir 32. The ports (which preferably carry filters with 70 micron pores), are at external points of a housing formed by an upper housing portion 5 in effectively non-magnetic stainless steel and a lower housing portion 6 in soft, magnetizable steel which is bolted or welded to the upper housing portion 5 around a flange union 33.

A first controller is provided by a first solenoid 10 actuated by a first command signal to move movable armature 11A which pushes, e.g. through a buffer spring 46 for resilience, a needle 11B which constitutes a closure member in the normally open condition as shown. The first command signal will be incident from outside the valve housing such as from a computer or sensor in the ABS. This signal will select the closed condition of a normally open fluid interconnection comprising in turn a plurality of multi-radial bores 12 from the first port 2 to an axial boring 12A, then a normally unobstructed seating 13 of a brass valve closed by needle 11B, then a manifold area 14 and finally an always open conduit 15 which may comprise a plurality of relatively narrow drillings as shown, which are directed parallel to the axis and on a cylinder surrounding the relatively wide central and axial bore 12A, to second port 3. Thus the second port, and indeed the normally open interconnection 12-15 thereto, can be selectively closed by the first controller i.e. solenoid parts 10, 11A, 11B.

By means of a second controller (e.g. solenoid) the manifold 14 and conduit means 15 also participate in a fluid interconnection between the second port 3 and the third port 4, which is normally closed by a preferably conical projection or attachment 34 carried by or on a second movable armature 17. Armature 17 is biased upwards to normal closure against a valve seat 23 by a coil spring 35 reacting against a second fixed soft steel armature 36. The fixed and moving armatures 36 and 17 enable opening of the fluid interconnection to third port 4 when a second coil 16 receives a command signal. The fixed armature is bored at 18 to participate in the fluid interconnection from port 3, which otherwise is provided by the fact that the first and second moving armatures 11A and 17, and the valve needle 11B have different (e.g. hexagonal) external shapes from the bores in which they slide, leaving fluid gaps. Presently preferred are hexagonal external shapes in cylindrical bores. Thus, the fluid interconnection from port 3 is 15, 14, 11B, 11A, 18, 17, 23 to port 4, when seat 23 is unobstructed.

A supplementary fluid interconnection from port 3 to port 2 exists whenever the pressure at port 3 is the higher. A stainless steel ball valve 19 is then forced off its seating 21 against a return coil spring 20, so that fluid returns from port 3, through a central bore 22 in a cylindrical end insert 37, then through spaces 12A and 12 to port 2. This supplementary one-way path bypasses the route through passages 15, manifold 14 and seat 13, preferably with much greater flow capacity. When bore 2 is at the greater pressure, ball 19 is forced harder onto its seating 21, and the route via passage 15 is no longer bypassed.

A first magnetic circuit, for solenoid coil 10, is provided partly by the lower housing portion 6 in soft steel, a lower body portion 38 machined from soft steel, e.g. having an annular flange 39 retained by housing 6, and an upper washer 40 likewise in soft steel; the circuit closely surrounds the former 10A of coil 10.

A second magnetic circuit, for second solenoid coil 16, is provided by a lining 41 in soft steel, within the non-magnetic upper housing portion 5, and a lower washer 42 in soft steel. The fixed armatures complete the first and second circuits, leaving the short working gaps for the moving armatures. Again, a former 16A for second command coil 16 should be surrounded as closely as possible by the second magnetic circuit.

Fluid tightness at pressure is maintained by a non-magnetic tube 43 containing the armatures too, and also by upper and lower O-rings 44 and 45.

The lower movable armature 11A moves the needle 11B through a resilient buffer spring 46 against a return spring 47, which acts between a fixed member (e.e. the surround of valve seat 13) and a projecting clip or flange 48 on the needle. Spring 47 normally forces the projection 48 against the lower end of a fixed armature 49 through the cylindrical bores in which the hexagonal non-magnetic needle 11B slides.

An upper extension 11C of the needle 11B passes through the moving armature 11A and carries a stop projection 50 which not only limits upward movement of the moving armature, but also keeps buffer spring 46 in compression. The upper limit of projection 50 is set by projection 48 abutting fixed armature 49.

In order to minimize magnetic interference between the coils, the upper housing 5 is non-magnetic, and also an aluminum isolating washer 51 is located or gripped between the two magnetic circuits.

Operation can be in five alternative modes:

Mode 1

The normally open lower and normally closed upper solenoid valves are unenergized, and first port 2 communicates via 12-15 with second port 3. The pressure at port 3 is less than that of a source 30 connected to circular port 2 and the ball valve 19, 21 is closed. When applied to an ABS system this represents normal braking.

Mode 2

The same as for Mode 1 but the port 3 is actuated or allowed to be subjected to a higher fluid pressure than port 2. Then the ball seating 21 is opened by the supplementary, high-flow path via 22 bypasses the slower flow path via 15. When the valve is in an ABS, Mode 2 is when the brake pedal is quickly or slowly released after or during use.

Mode 3

The normally unobstructed valve seat 13 is closed by a command energizing the first solenoid, the ball valve 19, 21 remains closed. Port 2 is cut off, and Port 3 can only communicate, via paths 15, with the interior of the housing up to the still closed valve seat 23. In an ABS, this mode would be set up when incipient locking has been sensed, e.t. one rotating wheel is slowing down rapidly, or more rapidly than other wheels. Then the brake pedal pressure at Port 2 is isolated from the housing, but the existing pressure is maintained at Port 3, within the housing and at this wheel braking actuator. Thus a sensed tendency to wheel locking is reduced. Modulation between Mode 3 and Mode 1 may be required.

Mode 4

The upper solenoid coil 16 is energized to open normally closed port 4, with the normally open lower valve still closed as in Mode 3. Ports 3 and 4 are now in communication and port 2 at brake pedal pressure is still isolated. While the lower valve seat 13 is closed, the ball valve passage 22 has no effect (at least while brake pedal pressure is high). For ABS, this is brought about by sensing of a real or drastic wheel locking. Port 3 (via paths 15) becomes automatically connected by the valve of the invention to port 4, i.e. the zero pressure of the reservoir and the ABS completely and rapidly releases the braking effect at the locked wheel, which unlocks. Since the input port 2 is isolated, the immediate anti-lock effect is not dependent in any way on whether manual braking effort is continued. Of course, if braking continues after locking is no longer being sensed, the incipient locking condition may re-commence; however, it will again be rapidly reduced or released as before. Modulation between Mode 4 and Mode 1 also may be required.

Mode 5

The upper normally closed valve is opened, but the lower normally open valve is not energized. Then all three ports are connected together. In a braking system, this represents purging of the pressure cylinder 30 and all wheel cylinders 31, by their connection to the hydraulic oil reservoir.

It will be noticed that for Mode 3 (incipient locking), all the ports are isolated from each other although Port 3 is always open to the interior of the housing in this embodiment; on the contrary, for Mode 5 (Purge) all the ports are opened and interconnected.

Sometimes one or each of the command signals is expected to be incident only very briefly, e.g. 0.8 milliseconds as embodied in one ABS application, but many times in rapid succession. In such cases, the number of times in the coils and their inductance, impedance and other parameters must be chosen to enable electrically the required rapid energization and de-energization (sometimes known in this context as "modulation"). In the ABS environment this would correspond to intermittent low friction driving condition such as black or glare ice, which each time should be reacted to quickly with anti-lock action, but also each time normal braking should be resumed as quickly as possible after an ice path has been traversed.

Referring now to FIG. 2, an alternate embodiment of the invention is illustrated and denoted generally by the reference numeral 60 and has a body 62 with a stepped, generally cylindrical configuration with a small diameter end portion 64. A sealing groove is provided therearound with a seal ring 65 received therein for engaging in sealing contact with a suitably sized and configured bore in a brake system attachment block or fitting (not shown). The axial end of diameter 64 has provided therein a signal output port 66 which communicates, with a chamber indicated by reference numeral 68 in FIG. 2.

The body 62 has a stepped, larger diameter portion 80 axially adjacent diameter 64 and having an annular recess 72 provided therein. At least one, and preferably a plurality, of radial passages 73 are provided in a collector groove 70 formed in diameter 80 and which passages communicate with an axial bore 74. If desired, a suitable protective screen 78 may be provided over the annular recess 70.

The body 62 has a third stepped diameter 84, which is larger than diameter 80; and, diameter 84 has an annular groove provided therein with a seal ring 82 received therein, and is adapted for engaging a second diameter bore in a block or fitting (not shown). The body diameter 82 has provided therein and spaced from the groove for O-ring 82 another annular collector groove 86 which communicates with an axial passage 88 provided in the body 62 which passage extends upwardly in FIG. 2 to communicate with the bottom 90 of a counterbore formed in the body 62. Collector groove 86 may also be covered with a protective screen 87.

An insert or plug 92 is received in the bore 74 in a generally press-fitted engagement and has an axial passage 94 provided therethrough which communicates with a counterbore 96 provided in the lower end thereof and which communicates with chamber 68 through screen 95. Plug passage 94 has a tapered valve seat 97 formed in the upper end thereof and a cross-port 98 formed in the wall of counterbore 96, which port 98 communicates collector groove 70 with counterbore 74. By-pass passages 101 communicate the region above valve seat 97 with the chamber 68 through filter screen 95.

A ball-type check valve 100 is received in counterbore 96 and is retained therein by a tubular bushing 101 pressed into the end of counterbore 74. The upper end of the bore 103 of bushing, 102 services as a valve seat 104 for valve 100, which is biased against seat 104 by spring 106. Bore 103 communicates via filter 95 with chamber 68.

Body 62 has a radially outwardly extending flange 108 formed on the upper end of flat-bottomed counterbore 90, which has the housing cover attached thereover, as will be hereinafter described. Intermediate flange 108 and body diameter 84 is cylindrical body section 110 having a groove therein with an O-ring 112 received therein for sealing about the inner periphery of a recessed block or fitting (not shown). A tubular extension 114 formed integrally with body 62 extends upwardly from the counterbore bottom 90; and, extension 114 has a bore 116 therethrough which communicates with bore 74.

Bore 116 has slidably received therein a generally cylindrical valve member 118 in sliding engagement, the member 116 having a reduced diameter pilot portion 120 at its upper end and a tapered poppet 122 on its lower end.

Poppet 122 is biased upwardly to a normally open position with respect to valve seat 97 by spring 124 having its lower end registered on a flanged portion 126 of plug 92 surrounding valve seat 97. The upper end of spring 124 is registered on a shoulder between poppet 122 and valve member 118.

A bobbin member 98 is provided for two axially spaced coils, the dual bobbin preferably formed integrally of non-magnetic material, with an extension 128 on one end thereof received in counterbore 90 and retained therein by engagement with barbs 130. The bobbin member has a central bore 132 provided therethrough.

The bobbin 128 has a pair of spaced flanges 134, 136 provided on the lower portion thereof between which is wound a first electromagnetic coil 140. Spaced adjacent flange 136 and formed integrally with the bobbin member 128 is an additional flange 142 which has received therebetween a disc 144 formed of material having a high magnetic permeability.

Bobbin member 128 has a second pair of flanges 146, 148 provided thereon in axially spaced arrangement with respect to the flanges for coil 140. The flanges 146, 148 comprise formers between which is wound a second electromagnetic coil 150.

An additional flange 152 is spaced closely adjacent the lower flange 146 for coil 150; and, the flange 152 retains in position a second disc 154 formed of material of high magnetic permeability disposed between flanges 146 and 152.

A tubular member 156 is received in the bore 132 of the bobbin member 128 and is guided therein by a plurality of circumferentially disposed ribs or flutes 158, as shown in Figure 3, provided in the bore 132 of the bobbin 128 in the region below flange 152. The spaces between the flutes 158 comprise fluid passages 160.

The inner periphery of tubular member 156 is sealed about the outer periphery of the body extension 114 by a suitable seal ring 162. The tubular member 156 is closed at its upper end which has provided therein a central passage 164 which communicates wtih the interior of the tubular member 156 and with the spaces between the ribs or flutes by means of cross-passages 168 provided on the upper closed end-face of the member 156.

The bobbin member has the lower end thereof in FIG. 2 spaced from the bottom of counterbore by a suitable amount to provide radial passage 170 along the bottom of counterbore 90 for fluid communication between the grooves 160 formed between the flutes 158 and the passage 88.

A tapered valve seat 172 is provided on the upper end of the passage 164 through the closed end face of tubular member 156. The valve seat 172 has received thereagainst, in normally closed relationship, a tapered poppet 174 provided on the lower end of a magnetic armature 176 received in sliding engagement in the interior of upper tubular member 178 which is received in the bobbin bore 132. Tubular member 178 is closed at its upper end by a plug 180. A suitable spring 182 has the lower end registered against the upper end of armature 176, with the upper end of the spring registered against the under-surface of the plug 180 for biasing the armature and poppet valve 174 in a downward direction causing the poppet to seat against the valve seat 172 when the coil 150 is not energized.

A second armature member 184 formed of material of high magnetic permeability and having a generally tubular configuration is received within tubular member 156 in free sliding arrangement.

Armature 184 which has an aperture formed therein with the pilot portion 120 of valve member 188 extending therethrough in a sliding fit, with the armature retained thereon by any suitable expedient such as snap ring 186.

The armature has a counterbore 188 provided in the lower end thereof which is arranged in a sliding fit over the outer diameter of the valve member 118. A suitable spring 190 has one end registered against a shoulder or step formed on the upper end of the larger diameter of valve member 118 by the pilot portion 120, with the upper end of the spring 190 registered against the upper end of the armature counterbore 118. The spring 190 being operative in compression to bias the armature 184 to its upward position causing the upper end thereof to register against the underside of the closed end of tubular member 156.

Armature 184 has at least one, and preferably a plurality, radially extending passage 186 provided thereacross for fluid flow across the upper surface of armature 184 from the valve passage 164. In the presently preferred practice of the invention, the armature 184 is guided for movement at is upper end about the pilot portion 110. The outer diameter of the armature 184 provides a suitable clearance with the interior diameter of tubular member 56 such that fluid flow may occur therebetween.

It will be understood that the outer diameter of valve member 118 also has a suitable clearance with bore 116 of the body 114 such that fluid flow may occur upwardly and therebetween. The lower end of the valve member 118 being piloted by the return spring 106 provided between plug 92 and the lower end of the valve member 118, with the poppet 122 received through the region of the spring 106. Spring 106 is operative to bias the valve member and poppet 122 in an upward direction so that poppet 122 is in a normally open condition with respect to valve seat 97.

A pole frame, denoted 189 on the lefthand side of the axis of symmetry of the valve 60 and 189' on the righthand side is formed of ferromagnetic material and provides a flux loop about the coils. It will be understood that two different styles of pole frame are illustrated in half-section in Frame 2 and that either may be employed.

The valve assembly 60 is covered by a housing shown in one style having two sections, an upper shell 190 and a lower shell 192 on the left of the axis of symmetry of the valve, with a mounting flange 194 attached thereto. Shells 190, 192 may be joined by weldment or clamping at their parting line between flanges 196, 198 provided respectively thereon. The lower shell has an inwardly turned flange 200 registered against the underside of body flange 108 for retaining the housing on the body 62.

Another version of the housing is illustrated in FIG. 2 in half-section on the right side of the axis of symmetry as an alternative unitary one-piece shell 202 having a deep drawn cup-shape and with a convolution 204 crimped or spun over body flange 108', and with a mounting flange 194' registering against convolution 204.

In operation, as installed in an anti-lock braking system, the port 66 is connected to the brake actuator circuit, ports 73 are connected to the source of fluid pressure such as a brake master cylinder and port 88 is connected to a reservoir return line. It will be understood, as described above, that the body fitting 62 is designed to be inserted into a common block or fitting (not shown) having stepped concentric bores adapted for sealing engagement with the seal rings 65, 82 and 112.

The passage 73 is thus also arranged to communicate with the brake actuator line passage 66 through bypasses 101 when valve passage 94 is open. As described hereinabove, the valve poppet 122 is biased to the normally open position with respect to valve seat 97 when coil 14 is not electrically energized.

The valve poppet 174 is biased by spring 182 to the normally closed position with respect to valve seat 172 when coil 150 is not electrically energized.

In the normally open position, poppet 122 permits fluid pressure communication from the source through port 73, cross port 98, counterbore 96, valve passage 94, upwards between valve member 118 and bore 110 and in the valve chamber to the region below valve passage 164 and the interior of the tubular member 156. Fluid pressure is also applied via passage 66 to the brake actuator, inasmuch as passage 66 is continuously connected to the inlet passages 73 via cross port 98 open valve passage 94 and by-passes 101. This corresponds to Mode 1 operation.

For Mode 2 operation, coils 140 and 150 remain unenergized, poppet 122 remains in the normally open condition with poppet 174 in the closed position and check ball 100 is unseated by higher in chamber 68 than from cross port 98 pressure to permit flow from the brake actuator through bore 100 to permit an additional passage for communication between the brake actuator and the ports 73.

For Mode 3 operation, coil 140 is energized by the ABS Controller (not shown) closing poppet 122 against valve seat 97 thus isolating the region above valve seat 97 within tubular member 156 from pressure introduced through ports 73. This has the effect of isolating the fluid pressure source, such as the brake master cylinder, from the chamber 168. In Mode 3 operation, check valve 100 remains closed. This condition represents incipient locking as sensed by a suitable wheel velocity sensor (not shown) which in turn enables the ABS a controller (not shown) for applying the aforesaid signal to the coil 14. In the Mode 3 condition, isolation of the fluid pressure source applied to port 73 at the instant of incipient wheel locking, permits the brake line pressure from the source as for example, the master cylinder, to be maintained at its level at that instant, but no further pressure can be applied to the port 66 and the brake actuator.

For Mode 4 operation, representing wheel lockup in an ABS system, a wheel sensor (not shown) and controller (not shown) provide current to coil 150 for opening poppet 174 from seat 172 and permitting the pressure in the region within tubular member 156 and below pasage 164 to now flow upwards through passage 164 and through cross-passages 168 into the passages 160 between ribs 158, shown as groove 160 in FIG. 3, and flows through the cross-passage 190 at the bottom of counterbore 90 and through passage 88 to the reservoir.

For Mode 4, the ABS control signal to the coil 150 can thus pulse the poppet 174 to control bleeding of the pressure in the valving chamber to effect unlocking of the wheel; and, during such pulsing valve poppet 122 is maintained in the closed position such that no fluid is replenished through port 73, that is, the pressure source remains isolated from the port 66. When the energization of coil 150 has opened poppet for a sufficient length of time to reduce the pressure in the valving chamber and consequently in port 66 to permit some wheel rotation after lockup, that is, a condition of at least incipient locking is regained, then energization of coil 150 is terminated, poppet 174 closes against seat 172 and pressure is maintained again in the valving chamber and in the passage 66 to the brake actuator.

For Mode 5 operation, coil 140 is not energized by the controller and coil 150 is energized to open poppet 174 thereby permitting flow to passages 168, 160, 88 and to the reservoir (not shown) and purging of the valving chamber and release of any pressure applied through inlet port 73. This condition represents an "all dump" condition.

The present invention thus provides a unique and novel electromagnetically actuated valve assembly for anti-lock brake systems. Upon the system sensor detecting substantial loss of wheel rotation or incipient locking, one solenoid is energized to close a normally open valve to isolate the source of fluid pressure from brake actuator in order to maintain the pressure to the brake actuator at a fixed level. The valve of the present invention utilizes a single stepped diameter cylindrical fitting on the body thereof for the signal output, the inlet and the dump or reservoir return port and is adapted for simultaneous connection of all three ports upon insertion into a valve block or fitting having stepped bores therein. Seal rings are disposed about the stepped diameters of the fitting provide sealing between the fitting and valve block. The unique construction of the present valve enables ease of assembly and connection of a three port valve to an anti-lock braking system on a vehicle and eliminates the need for separate lines and fittings for each valve port.

A second solenoid operated normally closed valve is included and may be pulsed separately by the controller to incrementally bleed fluid from the isolated valving chamber in the event of wheel lockup.

Although the invention has been described with respect to the illustrated embodiments, it will be understood that modifications can be made; and, the limits of the invention are described by the following claims.

We claim:

1. A valve assembly for use in a vehicle anti-lock braking system (ABS) comprising:
   (a) a valve body having aligned portions of differing cross-sections adapted for connecting in a multi-ported common recess in a receptacle and having,
      (i) a first cross-section having an inlet port formed therein in a direction transverse to the direction of insertion into said recess,
      (ii) a second cross-section having a dump port provided therein in a direction transverse to the direction of insertion into said recess, said dump port being spaced from said inlet port,
      (iii) a signal or service port disposed in said portions in a direction common with said direction of insertion;
   (b) means defining a fluid pressure tight valving chamber;
   (c) a first normally open electrically actuated valve means disposed for controlling flow between said inlet port and said valving chamber and operative upon electrical actuation to isolate said chamber from said inlet port;
   (d) a second normally closed electrically actuated valve means disposed for controlling flow between said valving chamber and said dump port and operative upon electrical actuation to enable fluid flow from said chamber to said dump port; and,
   (e) means defining a continuously open passage between said valving chamber and said service port.

2. The valve assembly defined in claim 1, wherein said first and second valve means are solenoid operated valves with the respective coils thereof disposed in spaced axial alignment with the direction of said service port.

3. The valve assembly defined in claim 1, wherein said first and second valve means are solenoid operated with the respective coils thereof disposed in spaced axial alignment and with the respective armatures thereof disposed in said valving chamber.

4. The valve assembly defined in claim 1, wherein said body includes a third one-way check valve means connecting said service port to said inlet port.

5. The valve assembly defined in claim 1, wherein said body has a stepped generally cylindrical configuration with said first cross-section comprising a small diameter portion and said second cross-section comprising a larger diameter portion with said service port formed axially in the end of said small diameter portion.

6. A valve assembly for use in vehicle anti-lock braking system (ABS) comprising:
   (a) body means defining therein a fluid pressure-tight valving chamber and having an attachment fitting with a stepped generally cylindrical configuration with a first diameter portion having fluid pressure source inlet port formed therein and a second larger diameter portion having a fluid pressure dump port therein and a service outlet or brake actuator port provided axially in the end of said first diameter portion; and,
   (b) a first normally open solenoid operated valve means including a first valve seat having the armature thereof disposed in said chamber and operative upon electrical actuation to close and isolate said chamber from said inlet port;
   (c) a second normally closed solenoid operated valve means including a second valve seat having the armature thereof disposed in said valving chamber and operative upon electrical actuation to open and enable fluid flow from said chamber to said dump port;
   (d) said body means defining a continuous fluid passage between said service port and said valving chamber.

7. The valve assembly defined in claim 6, further comprising a one-way check valve interconnecting said inlet port and said service port, said one-way check valve operative to permit flow only from said service port to said inlet port.

8. The valve assembly defined in claim 6, wherein said first and second solenoid operated valves have the respective coils thereof disposed in axially spaced aligned relationship.

9. The valve assembly defined in claim 6, wherein said first and second solenoid valve means each have the respective coil thereof surrounding a portion of said valving chamber.

10. The valve assembly defined in claim 6, wherein said first and second solenoid valve means have the respective coils thereof wound on a common member in axially spaced arrangement.

11. The valve assembly defined in claim 6, wherein said first and second solenoid valve means have their respective coils disposed so as to surround portions of said valving chamber.

12. An anti-lock, braking system valve assembly comprising:
   (a) a valve body having an inlet port adapted for connection to a source of brake-actuating fluid pressure;
   (b) said body having a dump port adapted for connection to a reservoir for said fluid;
   (c) said body having a signal port adapted for connection to a fluid pressure responsive brake actuator;
   (d) an electrically actuated valve having a valving chamber connected to said inlet, dump and signal ports;
   (e) said valve operative in response to a first command signal to isolate said inlet from said signal and dump ports and to maintain said signal port open;
   (h) said valve in response to said second common signal to maintain said inlet port isolated, said signal port open and to open said dump port; and,
   said valve has a common connector fitting provided therein, said fitting having all of said ports thereon with said signal port provided in the end thereof with said dump and inlet ports on the periphery thereof and adapted for common insertion into a receptacle.

13. The system defined in claim 12, wherein said common connector fitting has said inlet and dump ports disposed in axially spaced relationship on the periphery thereof.

14. The system defined in claim 12, wherein said end fitting includes a check valve permitting one-way flow into said signal port.

15. The system defined in claim 12, wherein said valve includes a valving chamber with said inlet port communicating with said chamber through a normally open valve, said dump port communicating with said chamber via a normally closed valve and said signal port in continuous communication with said chamber.

16. The system defined in claim 12, wherein said valve includes a pair of solenoids having the coils thereof wound in axially spaced arrangement.

17. The system defined in claim 12, wherein said valve includes a pair of solenoids having the coils thereof wound or integrally formed bobbins.

* * * * *

UNITED STATES PATENT AND TRADEMARK OFFICE
CERTIFICATE OF CORRECTION

PATENT NO.   : 4,859,005
DATED        : August 22, 1989
INVENTOR(S)  : Pierre J. Rey; Maurice DeRaco It is certified that error appears in the above-identified patent and that said Letters Patent is hereby corrected as shown below:

On the title page, assignee should read:

--[73] Assignee:  Eaton S.A.M., Monaco--.

Signed and Sealed this

Fifteenth Day of May, 1990

Attest:

HARRY F. MANBECK, JR.

*Attesting Officer*    *Commissioner of Patents and Trademarks*